PRIOR ART

United States Patent Office 3,284,243
Patented Nov. 8, 1966

3,284,243
GAS DIFFUSION OF ELECTRODES OF ORIENTED POROSITY AND PROCESS OF PRODUCING SUCH ELECTRODES
Ferdinand von Sturm, Erlangen, Germany, assignor to Siemens-Schuckertwerke Aktiengesellschaft, Berlin-Siemensstadt, Germany, a corporation of Germany
Filed Dec. 11, 1962, Ser. No. 243,846
Claims priority, application Germany, Dec. 14, 1961, S 77,126
7 Claims. (Cl. 136—120)

My invention relates to gas-permeable electrodes for electrolytic purposes, and in a more particular though not exclusive aspect to gas electrodes for fuel cells.

In such electrodes the obtainable current density depends substantially on the formation and nature of the three-phase boundary where the gaseous phase (fuel gas or oxygen) adsorbed to the solid phase (catalyst-electrode) coacts with the liquid phase (electrolyte) and is thus brought into an ionized state to be electrochemically utilized.

As a rule, the gas-permeable electrodes nowadays used are diffusion electrodes. The reactions take place in pores partly filled with electrolyte and partly with reaction gas, the three-phase boundary being formed by the boundary line between pore wall, gas and liquid. The most common electrodes are pressed or sintered from granular material and comprise a wide variety of pore shapes and pore sizes in each electrode. In accordance with the known relation $$p_K = \frac{2\sigma}{r}$$

the capillary pressure $p_K$ of the electrolyte is a function of the pore radius $r$ and of the surface tension $\sigma$. In excessively narrow pores the capillary pressure exceeds the gas pressure ($p_K > p_G$), the pore fills up and becomes electrochemically inactive; in excessively wide pores the gas pressure preponderates ($p_G > p_K$). Hence no three-phase boundary comes about, so that the gas bubbles through the pore without electrochemical action.

The known non-gassing double-layer electrodes provide for better pore utilization by providing two layers, one positioned on the side of the electrolyte and having very fine pores, and a coarsely porous layer on the gas side. The attainable improvement, however, leaves much to be desired because many of the fine pores remain electrochemically inactive. Indeed, from a statistical distribution of the fine pores relative to the coarse pores it appears impossible that each fine pore can register with a coarse pore.

It is known from German Patent No. 1,021,041 to produce homoporous diffusion electrodes by sintering coal or metal powder together with mutually parallel thread-like filler bodies, for instance textile fibers, and thereafter dissolving the filler bodies. Thus, numerous parallel pores of the same diameter are obtained. This increases the theoretical length of the three-phase boundary due to the greater number of pores per electrode surface, but with a constant pore diameter there is no assurance that an equilibrium between gas and capillary pressures will come about in each of the pores. Consequently such electrodes do not afford, or are not reliable in, utilizing the theoretical increase in length of the three-phase boundaries. This also applies to electrodes in which the filler bodies are partly arranged in diverging bundles, as is also known from the aforementioned patent.

It is an object of my invention to devise a gas diffusion electrode of oriented porosity which affords a greater electrolytic activity by increasing the pore utilization beyond the degree heretofore attained.

Another object, more specifically, is to improve such electrodes towards achieving a pressure equalization and hence an active three-phase boundary within each or substantially each of the electrode pores.

To this end, and in accordance with a feature of my invention, I provide a gas diffusion electrode in which all pores taper from the coarsely porous gas side to the fine-porous electrolyte side of the electrode structure. Thus the individual pores taper conically along their length.

According to another feature of my invention such an electrode structure is composed of parallel metal threads or metal-coated threads which form interstitial pores between the two electrode sides and whose diameter increases continuously from the gas side to the electrolyte side of the electrode. Such an electrode can be made by comprising it of metallic filaments or threads of constant diameter and thereafter applying a non-electric metallizing treatment. For this purpose, a metallizing solution comprising a dissolved metal and a reducing agent is passed through the electrode from the electrolyte side to the gas side, thus depositioning metal from the solution in proportion to the decreasing metal-ion concentration in the solution. Thus, the metal layer formed in each pore has a thickness which continuously decreases from the entering point of the solution to the point where it leaves the pore.

Another method of making an electrode according to the invention is to use threads of constant diameter and to effect pressing of the electrode with such a force distribution that it becomes more compact on the electrolyte side than on the gas side. With this method, the threads no longer extend parallel to each other in the finished electrode, and the pores between them taper continuously.

The invention will be further described with reference to the accompanying drawings in which.

Figure 1:
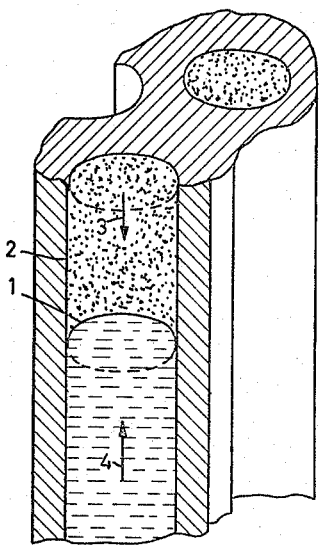
FIG. 1 is explanatory and shows a known gas permeable electrode by a fragmentary and sectioned perspective view.
Figure 2:
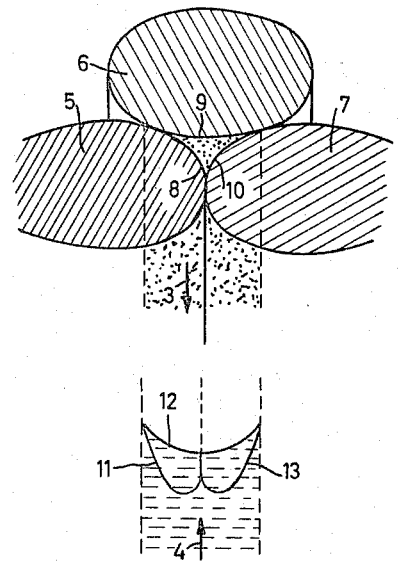
FIG. 2 shows schematically a pore and phase-boundary formation as it occurs in an electrode according to the invention.

In a conventional electrode as illustrated in FIG. 1, the three-phase boundary 1 of a cylindrical pore 2, partly filled with reaction gas 3 and partly with electrolyte 4, extends in one single plane and thus cannot be longer than the periphery of the pore. FIG. 2 shows the pore shape of an electrode according to the invention. By tightly packing the filaments 5, 6 and 7, there results an interstitial pore whose perimetric portions 8, 9 and 10 jointly constitute one-half of the thread periphery. Relative to the arcuate perimeter 8, 9, 10, the three-phase boundaries at 11, 12 and 13 in this pore is considerably extended because it bulges away from a diametrical plane. Due to such extension of the contact boundary between the three phases reacting with one another, an increased electrode activity is achieved.

Figure 3:
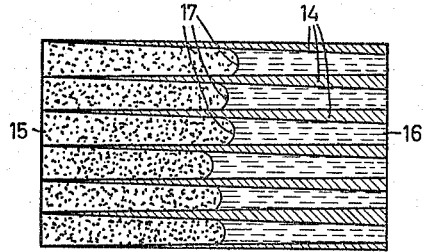
FIG. 3 shows a portion of an electrode exemplifying the invention sectioned along a group of tapering pores.

Furthermore, the diameter of the individual filaments or threads denoted by 14 in FIG. 3 continuously increases from the gas side 15 toward the electrolyte side 16. If the electrode is used for instance in a fuel cell, the fuel gas penetrates into the coarsely porous side 15, and the electrolyte penetrates into the finer pore openings on side 16. Thus, an equilibrium between the gas pressure and the capillary pressure is established ($p_G = p_K$), thereby securing the formation of a three-phase boundary 17 in each pore of the electrode, even in instances where the pore diameters are not completely identical in the same cross section of the electrode.

Thus, aside from increasing the electrode activity by increased length of the three-phase boundaries (FIG 2), the invention also achieves having substantially all of the numerous pores in the electrode contribute to producing the electrolytic conversion.

The above-described electrode according to the invention can be produced as follows.

Threads of several microns thickness are drawn from a ductile catalyst material (for instance Ag for an oxygen electrode, Pt for a hydrogen electrode) i.e. having the property of promoting ionization of such gases. These threads are combined to form a strand—for instance by twisting. In order to achieve the requisite mechanical density, the strands are then pressed or sintered in the proper parallel arrangement relative to one another. To secure such arrangement, the strands can be held together by a suitable sheath, envelope or bandage, if necessary.

As mentioned, there are different ways of producing the tapering of the pores. According to one way, the pressure applied during the pressing operation is uniformly distributed. The resulting pores then have constant cross sections along their length, and it is necessary to apply the non-electric metallizing treatment already described. However, if the force applied during the above-mentioned pressing operation, is made non-uniform so that the bundle strand of filaments is more compressed on the electrolyte side than on the gas side, the desired tapering pore configuration is directly obtained.

Figures 4, 5:
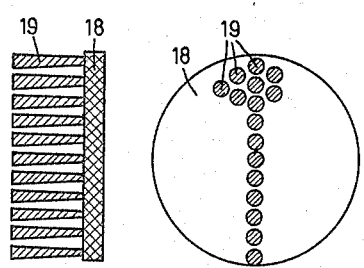
FIGS. 4 and 5 are a schematic lateral view and front view of another embodiment of an electrode according to the invention.

By cutting the strand into discs having about 2 to 4 mm. thickness, and preferably etching the cut surfaces if the material is relatively soft, electrodes are produced whose pores have the shape illustrated in FIGS. 2 and 3. When used in a fuel cell, part of the pore is filled with the reaction gas 3 and part with the electrolyte 4. For a thread thickness of 20 microns, the pore density of the electrode is for instance $5.8 \cdot 10^5$ per square centimeter. The three-phase boundary per square centimeter of electrode surface has a length of 18 meters and is thus by one order of magnitude larger than in a comparable conventional electrode manufactured from granular material. Another method for the production of electrodes makes use of the conventional process of forming thin metal threads having a diameter of a few microns (so-called "whiskers") by reduction from the vaporous stage of a compound of the material concerned, for instance silver (see: F. Blaha, "Metall," volume 1, 1959, pages 20 to 25). A mesh consisting of the same material as the threads to be produced is used as a carrier, and the threads precipitating from the gaseous phase, are grown on the carrier as closely adjacent to one another as possible under predetermined conditions of pressure, temperature and flow velocity. The threads thus assume a length of several millimeters and a brush-like arrangement. An example of an electrode thus produced is shown in FIGS. 4 and 5, where a wire mesh of silver is denoted by 18 and the grown whiskers by 19, only a few of them being shown in FIG. 5. It is not necessary for the individual threads to contact each other (FIG. 4). To achieve the desired tapering of the pores, the diameter of thread 19 is made to increase as the length of the thread increases. This is done by correspondingly modifying the working conditions, such as by supplying a foreign gas, whereby said increase starts from mesh 18 which constitutes the gas side of the finished electrode. However, the above-described metallizing method may also be used for producing the tapering pore shape.

Still another way of making the electrodes is to use threads of any desired non-catalytic metal i.e. a metal that does not have the property of promoting the ionization of gases, as a carrier material upon which the active material is applied, for instance by a galvanizing operation. Furthermore, plastic or glass fiber threads which are drawn from spinning nozzles may also be metallized with the catalyst material, for instance by vapor deposition or by passing the threads through a solution containing the metal plus a reducing agent.

I claim:
1. A gas diffusion electrode having a gas side and an electrolyte side and comprising an electrode structure composed of a multiplicity of filaments having metallic surfaces and extending approximately parallel and in contact with one another between said two sides, said filaments forming substantially parallel interstitial pores and said filaments having respective cross-sectional areas gradually decreasing from said electrolyte side to said gas side so that said pores continuously taper from said gas side to said electrolyte side, said filaments consisting of a non-catalytic carrier material and a coating of catalyst metal.

2. The method of producing gas diffusion electrodes for use in a fuel cell which comprises forming a strand from numerous substantially parallel filaments of electrode material, mechanically consolidating the strand under pressure to form a coherent structure having axially extending substantially parallel pores defined by the filaments, subjecting the filaments of the strand to a treatment of progressive intensity for narrowing the pores in a given direction along the length thereof, and transversely dividing the strand into electrode structures, whereby the electrode structures are formed with pores continuously tapering in the given direction, said pore-narrowing treatment comprising the application transversely to the strand of progressively varying pressure along the length of the strand in a given axial direction thereof when consolidating the strand.

3. The method of producing gas diffusion electrodes which comprises forming a strand from numerous substantially parallel filaments of electrode material, mechanically consolidating the strand under pressure to form a coherent structure having axially extending substantially parallel pores defined by the filaments, subjecting the filaments of the strand to a treatment of progressive intensity for narrowing the pores in a given direction along the length thereof, and transversely dividing the strand into electrode structures, whereby the electrode structures are formed with pores continuously tapering in the given direction, said pore-narrowing treatment comprising the step of subjecting the electrodes to metallization by passing through the pores in the given axial direction a metal solution reactive upon contact with the filaments and depositing metal on the filaments in the pores in progressively lesser amounts in a direction from the inlet of the solution to the pores toward the outlet thereof in proportion to decreasing metal-ion concentration in the solution.

4. The method of producing gas diffusion electrodes which comprises forming a strand from numerous substantially parallel filaments of electrode material, mechanically consolidating the strand under pressure to form a coherent structure having axially extending substantially parallel pores defined by the filaments, subjecting the filaments of the strand to a treatment of progressive intensity for narrowing the pores in a given direction along the length thereof, and transversely dividing the strand into electrode structures, whereby the electrode structures are formed with pores continuously tapering in the given direction, comprising the steps of forming the filaments of catalytically inactive material, and coating them with catalyst metal.

5. The method of producing gas diffusion electrodes which comprises forming a strand from numerous substantially parallel filaments of electrode material, mechanically consolidating the strand under pressure to form a coherent structure having axially extending substantially parallel pores defined by the filaments, subjecting the filaments of the strand to a treatment of progressive intensity for narrowing the pores in a given direction along the length thereof, and transversely dividing the strand into electrode structures, whereby the electrode structures are formed with pores continuously tapering in the given direction, the filaments being formed of catalytically inactive material electroplated with catalyst material.

6. The method of producing gas diffusion electrodes which comprises forming a strand from numerous substantially parallel filaments of electrode material, mechanically consolidating the strand under pressure to form a coherent structure having axially extending substantially parallel pores defined by the filaments, subjecting the filaments of the strand to a treatment of progressive intensity for narrowing the pores in a given direction along the length thereof, and transversely dividing the strand into electrode structures, whereby the electrode structures are formed with pores continuously tapering in the given direction, the filaments being formed of catalytically inactive material, and catalyst material being vapor-deposited upon the filaments.

7. The method of producing gas diffusion electrodes which comprises forming a strand from numerous substantially parallel filaments of electrode material, mechanically consolidating the strand under pressure to form a coherent structure having axially extending substantially parallel pores defined by the filaments, subjecting the filaments of the strand to a treatment of progressive intensity for narrowing the pores in a given direction along the length thereof, and transversely dividing the strand into electrode structures, whereby the electrode structures are formed with pores continuously tapering in the given direction, the filaments being formed of catalytically inactive material and being passed through a solution containing catalyst metal so as to become coated with catalyst.

References Cited by the Examiner
UNITED STATES PATENTS

| | | | |
|---|---|---|---|
| 2,678,343 | 5/1954 | Daniel | 136—120 |
| 2,805,274 | 9/1957 | Eisen | 136—120 |
| 2,860,175 | 11/1958 | Justi | 136—122 |
| 2,947,797 | 8/1960 | Justi et al. | 136—120 |
| 3,071,637 | 1/1963 | Horn et al. | 136—122 |
| 3,097,974 | 7/1963 | McEvoy et al. | 136—120 |

WINSTON A. DOUGLAS, *Primary Examiner.*

JOHN H. MACK, *Examiner.*

W. VAN SISE, A. SKAPARS, *Assistant Examiners.*